(12) United States Patent
Chun

(10) Patent No.: US 11,317,369 B2
(45) Date of Patent: Apr. 26, 2022

(54) METHOD AND USER EQUIPMENT FOR TRANSMITTING REGISTRATION REQUEST TO NETWORK, AND METHOD AND NETWORK DEVICE FOR RECEIVING REGISTRATION REQUEST

(71) Applicant: LG Electronics Inc., Seoul (KR)

(72) Inventor: Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 72 days.

(21) Appl. No.: 16/608,384

(22) PCT Filed: Apr. 25, 2018

(86) PCT No.: PCT/KR2018/004777
§ 371 (c)(1),
(2) Date: Oct. 25, 2019

(87) PCT Pub. No.: WO2018/199611
PCT Pub. Date: Nov. 1, 2018

(65) Prior Publication Data
US 2021/0112513 A1 Apr. 15, 2021

Related U.S. Application Data

(60) Provisional application No. 62/490,033, filed on Apr. 26, 2017.

(51) Int. Cl.
*H04W 60/00* (2009.01)
*H04W 48/18* (2009.01)
(52) U.S. Cl.
CPC ........... *H04W 60/00* (2013.01); *H04W 48/18* (2013.01)

(58) Field of Classification Search
CPC .............................. H04W 48/18; H04W 60/00
USPC ....................................................... 455/435.3
See application file for complete search history.

(56) References Cited

U.S. PATENT DOCUMENTS

| 5,442,806 | A | * | 8/1995 | Barber | ................... | H04W 72/02 |
| | | | | | | 455/435.2 |
| 7,305,251 | B2 | * | 12/2007 | Kuchibhotla | ......... | H04W 48/18 |
| | | | | | | 455/552.1 |
| 2013/0007232 | A1 | | 1/2013 | Wang et al. | | |
| 2016/0073327 | A1 | * | 3/2016 | Clougherty | ........... | H04W 48/04 |
| | | | | | | 370/254 |
| 2016/0353465 | A1 | * | 12/2016 | Vrzic | ................. | H04W 28/0247 |

(Continued)

FOREIGN PATENT DOCUMENTS

| WO | 2017005208 A1 | 1/2017 |
| WO | 2017034352 A1 | 3/2017 |

OTHER PUBLICATIONS

International Search Report from PCT/KR2018/004777, dated Jul. 30, 2018.

(Continued)

*Primary Examiner* — Joel Ajayi
(74) *Attorney, Agent, or Firm* — Dentons US LLP

(57) ABSTRACT

A user equipment (UE) in a wireless communication system selects a mobile communication network (for example, PLMN) to which a registration request is to be made. The user equipment selects a PLMN on the basis of network slice priority information or network slice essential access information and transmits a registration request for the selected PLMN.

4 Claims, 9 Drawing Sheets

(56) References Cited

U.S. PATENT DOCUMENTS

2017/0295531 A1* 10/2017 Singh ...................... H04W 8/08
2017/0303259 A1* 10/2017 Lee ....................... H04W 12/08

OTHER PUBLICATIONS

Written Opinion of the ISA from PCT/KR2018/004777, dated Jul. 30, 2018.
3GPP; TSG SA; System Architecture for the 5G System; Stage 2 (Release 15)', 3GPP TS 23.501 V0.4.0, Apr. 4, 2017.
3GPP; TSG SA; Service requirements for the 5G system; Stage 1 (Release 15)', 3GPP TS 22.261 V15.0.0, Mar. 17, 2017.

* cited by examiner (a) UE-P-GW user plane with E-UTRAN (b) Control Plane UE-MME

METHOD AND USER EQUIPMENT FOR TRANSMITTING REGISTRATION REQUEST TO NETWORK, AND METHOD AND NETWORK DEVICE FOR RECEIVING REGISTRATION REQUEST

This application is the National Stage filing under 35 U.S.C. 371 of International Application No. PCT/KR2018/004777, filed on Apr. 25, 2018, which claims the benefit of U.S. Provisional Application No. 62/490,033 filed on Apr. 26, 2017, the contents of which are all hereby incorporated by reference herein in their entirety.

TECHNICAL FIELD

The present disclosure relates to a wireless communication system, and more particularly, to a method and apparatus for transmitting/receiving a registration request.

BACKGROUND ART

Wireless communication systems are widely deployed to provide various kinds of communication content such as voice and data services. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DISCLOSURE

Technical Problem

A method of efficiently transmitting/receiving a signal in a system supporting new radio access technology (New RAT or NR) is needed.

New RAT includes network slicing. Along with the introduction of network slicing, there is a need for a method of allowing a user equipment (UE) to select a mobile communication network (e.g., public land mobile network (PLMN)) in consideration of a network slice.

The technical objects that can be achieved through the present disclosure are not limited to what has been particularly described hereinabove and other technical objects not described herein will be more clearly understood by persons skilled in the art from the following detailed description.

Technical Solution

In an aspect of the present disclosure, a method of transmitting a registration request to a network by a user equipment (UE) in a wireless communication system is provided. The method comprises: selecting a public land mobile network (PLMN) as a target PLMN based on network slice priority information or network slice mandatory access information; and transmitting a registration request to the selected PLMN.

In another aspect of the present disclosure, a UE for requesting registration to a network in a wireless communication system is provided. The UE includes a transmission and reception module, and a processor configured to control the transmission and reception module. The processor is configured to select a PLMN as a target PLMN based on network slice priority information or network slice mandatory access information, and control the transmission and reception module to transmit a registration request to the selected PLMN.

In another aspect of the present disclosure, a method of receiving a registration request from a UE by a network node in a wireless communication system is provided. The method includes transmitting network slice priority information or network slice mandatory access information for use in selecting a PLMN at the UE, and receiving a registration request for a specific PLMN from the UE.

In another aspect of the present disclosure, a network node for receiving a registration request from a UE in a wireless communication system is provided. The network node includes a transmission and reception module, and a processor configured to control the transmission and reception module. The processor is configured to control the transmission and reception module to transmit network slice priority information or network slice mandatory access information for use in selecting a PLMN at the UE, and control the transmission and reception module to receive a registration request for a specific PLMN from the UE.

In each aspect of the present disclosure, the UE may be configured to select a PLMN supporting all of network slices configured for the UE as the target PLMN.

In each aspect of the present disclosure, in the absence of the PLMN supporting all of the network slices configured for the UE, the UE may be configured to select a PLMN supporting a network slice of a highest priority as the target PLMN from among the network slices configured for the UE according to the network slice priority information.

In each aspect of the present disclosure, in the absence of the PLMN supporting the network slice of the highest priority, the UE may be configured to select a PLMN supporting a network slice of a second highest priority as the target PLMN from among the network slices configured for the UE.

In each aspect of the present disclosure, in the absence of the PLMN supporting all of the network slices configured for the UE, the UE may select a PLMN supporting all of network slices requiring mandatory access as the target PLMN from among the network slices configured for the UE according to the network slice mandatory access information.

In each aspect of the present disclosure, the network may provide network slice function information including at least one of the network slice priority information or the network slice mandatory access information.

The above technical solutions are merely some parts of the examples of the present disclosure and various examples into which the technical features of the present disclosure are incorporated can be derived and understood by persons skilled in the art from the following detailed description of the present disclosure.

Advantageous Effects

According to the present disclosure, uplink/downlink signals can be efficiently transmitted/received. Therefore, overall throughput of a radio communication system can be improved.

In a system supporting new radio access technology (New RAT or NR), signals can be efficiently transmitted/received.

A user equipment (UE) can select a public land mobile network (PLMN) in consideration of a network slice.

It will be appreciated by persons skilled in the art that that the effects that can be achieved through the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the disclosure, illustrate examples of the disclosure and together with the description serve to explain the principle of the disclosure.

BEST MODE FOR CARRYING OUT THE INVENTION

Figure 1:
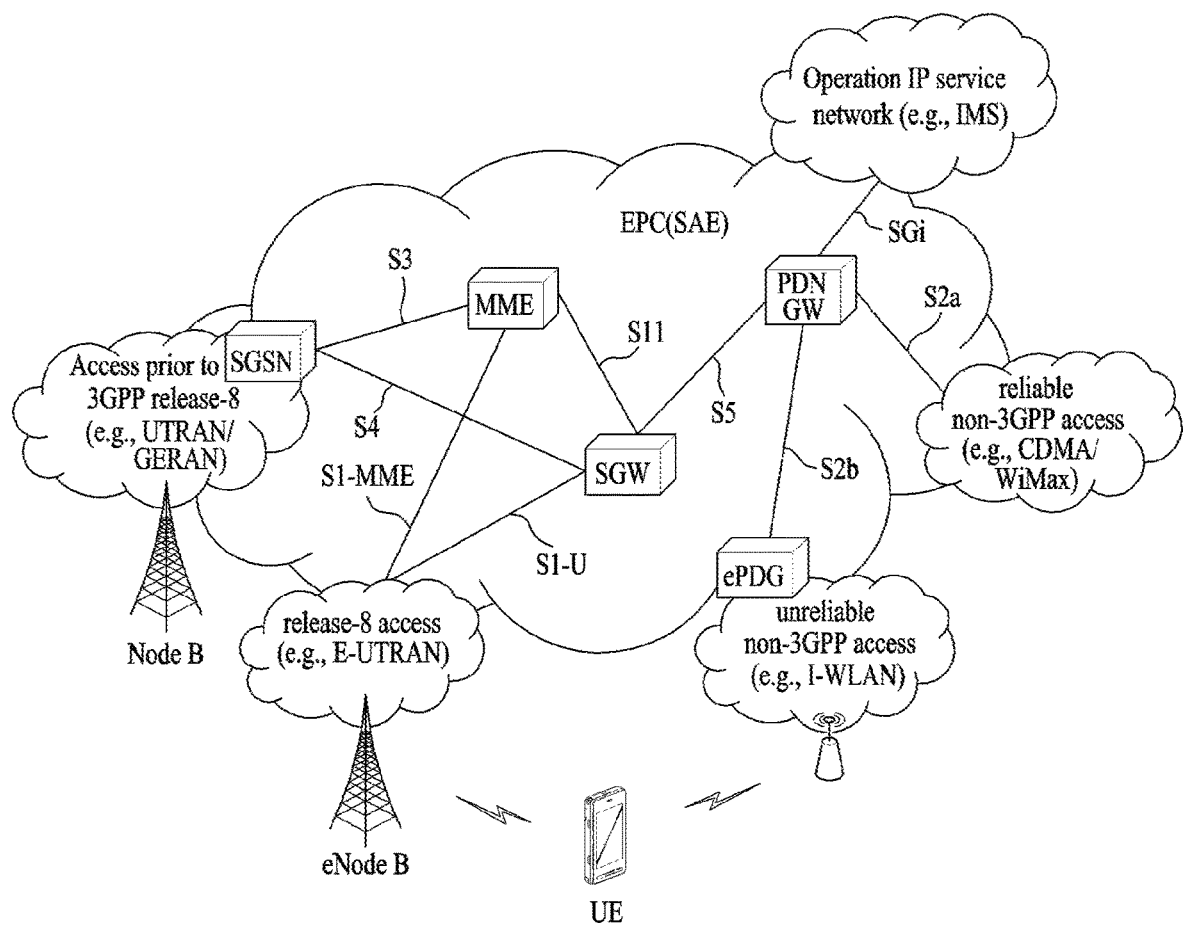
FIG. 1 is a schematic diagram showing the structure of an evolved packet system (EPS) including an evolved packet core (EPC).

Although the terms used in the present disclosure are selected from generally known and used terms while considering functions of the present disclosure, they may vary according to intention or customs of those skilled in the art or emergence of new technology. Some of the terms mentioned in the description of the present disclosure may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The examples of the present disclosure described hereinbelow are combinations of elements and features of the present disclosure. The elements or features may be considered selective unless mentioned otherwise. Each element or feature may be practiced without being combined with other elements or features. Further, an example of the present disclosure may be constructed by combining parts of the elements and/or features. Operation orders described in examples of the present disclosure may be rearranged. Some constructions or features of any one example may be included in another example and may be replaced with corresponding constructions or features of another example.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present disclosure (more particularly, in the context of the following claims) unless indicated otherwise in the specification or unless context clearly indicates otherwise.

The examples of the present disclosure can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, 3GPP NR system and a 3GPP2 system. That is, steps or parts that are not described to clarify the technical features of the present disclosure may be explained with reference to the above standard specifications.

Further, all terms used herein may be explained in the above standard documents. For example, one or more of 3GPP LTE technical specifications such as 3GPP TS 36.211, 3GPP TS 36.213, 3GPP TS 36.321, 3GPP TS 36.322, 3GPP TS 36.323, 3GPP TS 36.331, 3GPP TS 23.203, 3GPP TS 23.401, and 3GPP TS 24.301 and/or 3GPP NR technical specifications such as 3GPP TR 28.801, 3GPP TS 38.300, 3GPP TS 38.331, 3GPP TS 23.501, 3GPP TS 23.502, and 3GPP TS 23.503 may be incorporated by reference in the present disclosure.

Reference will now be made in detail to the examples of the present disclosure with reference to the accompanying drawings. The detailed description, which will be given below with reference to the accompanying drawings, is intended to explain exemplary embodiments of the present disclosure, rather than to show the only examples that can be implemented according to the disclosure.

Specific terms used for the examples of the present disclosure are provided to aid in understanding of the present disclosure. These specific terms may be replaced with other terms within the scope and spirit of the present disclosure.

The terms used in this specification are defined as follows.
Reference will now be made in detail. The detailed description, which will be given below with reference to the accompanying drawings, is intended to explain exemplary embodiments of the present disclosure, rather than to show the only examples that can be implemented according to the disclosure.

Specific terms used for the examples of the present disclosure are provided to aid in understanding of the present disclosure. These specific terms may be replaced with other terms within the scope and spirit of the present disclosure.

The terms used in this specification are defined as follows.

- IMS (IP Multimedia Subsystem or IP Multimedia Core Network Subsystem): An architectural framework for providing standardization for delivery of voice or other multimedia services over Internet protocol (IP).
- UMTS (Universal Mobile Telecommunications System): Global System for Mobile Communication (GSM)-based 3rd generation mobile communication technology developed by 3GPP.
- EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMTS.
- NodeB: A base station of GERAN/UTRAN which is installed outdoors and has coverage of a macro cell scale.
- eNodeB/eNB: A base station of E-UTRAN which is installed outdoors and has coverage of a macro cell scale.
- UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.
- HNB (Home NodeB): A base station of a UMTS network. The HNB is installed indoors and has coverage of a micro cell scale.
- HeNB (Home eNodeB): A base station of an EPS network. The HeNB is installed indoors and has coverage of a micro cell scale.
- MME (Mobility Management Entity): A network node of the EPS network performing functions of Mobility Management (MM) and Session Management (SM).
- PDN-GW (Packet Data Network-Gateway)/PGW/P-GW: A network node of the EPS network performing functions of UE IP address allocation, packet screening and filtering, and charging data collection.
- SGW (Serving Gateway)/S-GW: A network node of the EPS network performing functions of mobility anchor, packet routing, idle mode packet buffering, and triggering of the MME paging the UE.
- PCRF (Policy and Charging Rule Function): A network node of the EPS network making a policy decision for dynamically applying a differentiated QoS and charging policy on a service flow basis.
- OMA DM (Open Mobile Alliance Device Management): A protocol designed for management of mobile devices such as a cellular phone, a PDA, and a portable computer, that performs functions of device configuration, firmware upgrade, and error report.
- OAM (Operation Administration and Maintenance): A group of network management functions that provides network defect indication, performance information, and data and diagnosis functions.
- NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a P-GW.
- EMM (EPS Mobility Management): A sub-layer of a NAS layer, that may be in either an "EMM-Registered" or "EMM-Deregistered" state depending on whether a UE is attached to or detached from a network.
- ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an SI signaling connection established with the eNB. Depending on whether a NAS signaling connection, i.e., the ECM connection, is established, ECM may be in either "ECM-Connected" or "ECM-Idle" state.
- AS (Access-Stratum): This includes a protocol stack between the UE and a wireless (or access) network and is in charge of data and network control signal transmission.
- NAS configuration MO (Management Object): An MO used in the process of configuring parameters related to NAS functionality for the UE.
- PDN (Packet Data Network): A network where a server (e.g., an MMS (Multimedia Messaging Service) server, a WAP (Wireless Application Protocol) server, etc.) supporting a specific service is located.
- PDN connection: A logical connection between a PDN and a UE represented by one IP address (one IPv4 address and/or one IPv6 prefix).
- APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).
- RAN (Radio Access Network): A unit including a NodeB, an eNodeB, or gNB, and an RNC (Radio Network Controller) for controlling the NodeB and the eNodeB in a 3GPP network. The RAN is present between a UE and a core network, and provides connection to the core network.
- HLR (Home Location Register)/HSS(Home Subscriber Server): A database containing subscriber information of a 3GPP network. The HSS can perform functions such as configuration storage, identity management and user state storage PLMN (Public Land Mobile Network): A network configured for the purpose of providing mobile communication services to individuals. This network can be configured per operator. A PLMN may provide service in one frequency band or a combination of frequency bands. As a rule, the PLMN is limited by the borders of a country. According to national regulations, there may be one or more PLMNs per country. A relationship exists between each subscriber and his or her home PLMN (HPLMN). If communications are handled over a PLMN other than the home PLMN of each subscriber, this PLMN is referred to as a visited PLMN (VPLMN).

Access technology: When a UE attempts to select a specific PLMN, the UE uses an access technology (e.g., GSM, UTRAN, GSM COMPACT, E-UTRAN, or NG-RAN) associated with a PLMN to determine a radio carrier type to be searched for.

Camped on a cell: The UE (mobile equipment (ME) if there is no SIM) has completed the cell selection/reselection process and has chosen a cell from which the UE plans to receive available services. The services may be limited and the PLMN may not be aware of the existence of the UE (ME) within the chosen cell.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network. FIG. 1 is a schematic diagram showing the structure of an evolved packet system (EPS) including an evolved packet core (EPC).

gNB: A node that provides NR user plane and control plane protocol terminations towards a UE and is connected to a 5G core network (5GC) via a next generation (NG) interface (e.g., NG-C or NG-U).

5G access network (AN): An AN including an NG RAN and/or a non-3GPP AN connecting to a 5GC.

5G system: A 3GPP system consisting of a 5G AN, a 5GC, and a UE. The 5G system is also called a new radio (NR) system or an NG system.

NGAP UE association: A logical per-UE association between a 5G-AN node and an AMF.

NF service: Functionality exposed by a network function (NF) through a service based interface and consumed by other authorized NFs.

NG-RAN: A radio access network connected to a 5GC in a 5G system.

NG-C: A control plane interface between an NG-RAN and a 5GC.

NG-U: A user plane interface between an NG-RAN and a 5GC.

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
|---|---|
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Figure 2:
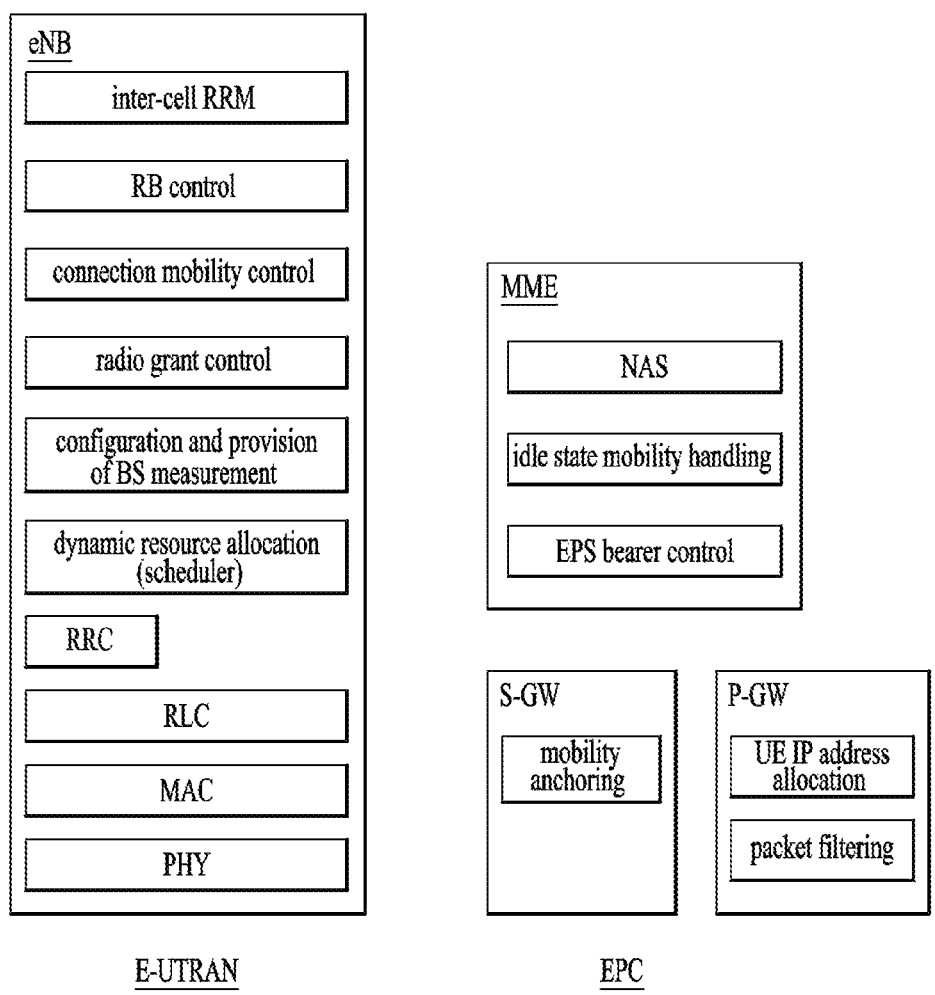
FIG. 2 is a diagram exemplarily illustrating architectures of a general evolved-UMTS terrestrial radio access network (E-UTRAN) and EPC.

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane. FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
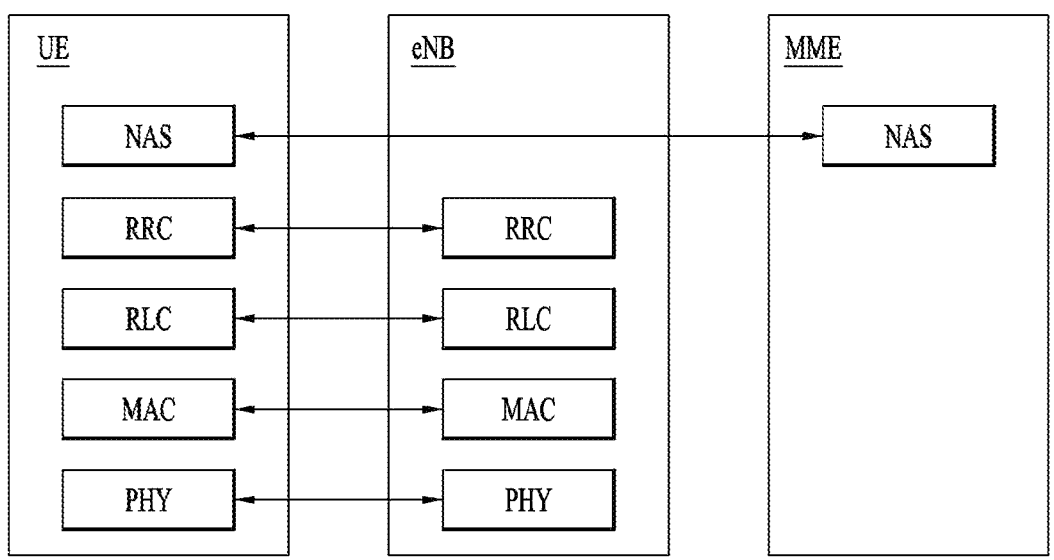
FIG. 3 is a diagram exemplarily illustrating the structure of a radio interface protocol in a control plane.
Figure 4:
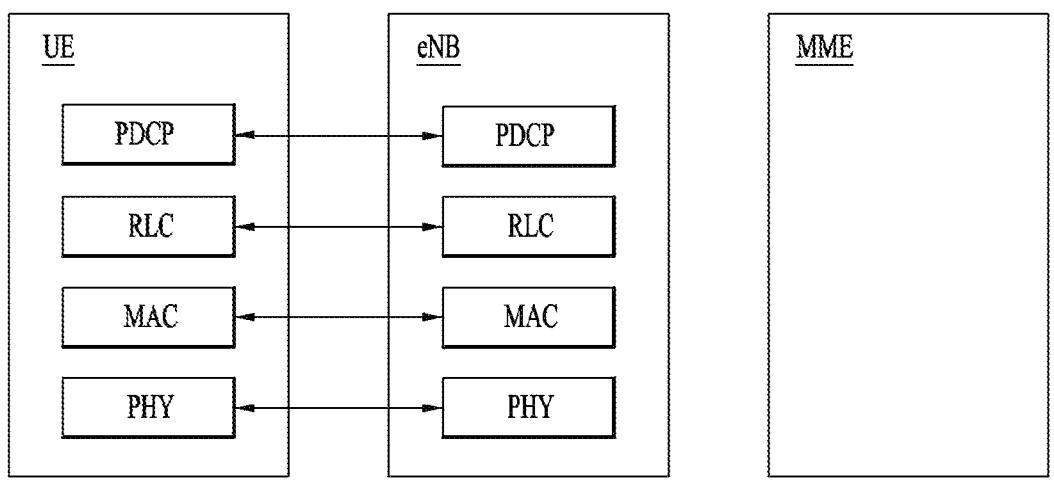
FIG. 4 is a diagram exemplarily illustrating the structure of a radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to physical downlink shared channel (PDSCH) and physical uplink shared channel (PUSCH) and control channels corresponding to physical downlink control channel (PDCCH), physical control format indicator channel (PCFICH), physical hybrid-ARQ indicator channel (PHICH) and physical uplink control channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interface.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interface having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish an RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (EPS Session Management) belonging to the NAS layer performs functions such as default bearer management and dedicated bearer management to control a UE to use a PS service from a network. A default bearer resource is assigned from the network during initial access to a specific Packet Data Network (PDN). In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
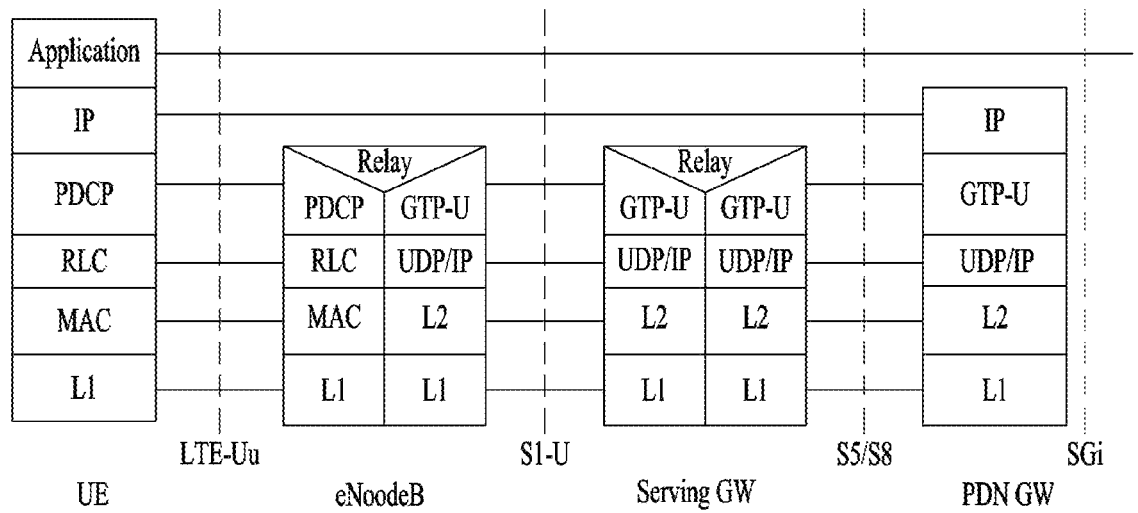
FIG. 5 is a diagram illustrating long term evolution (LTE) protocol stacks for a user plane and a control plane.
Figure 5:
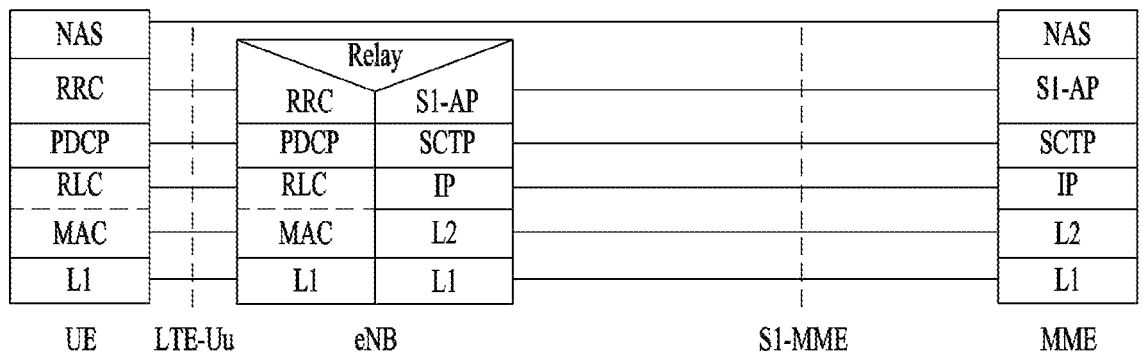

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
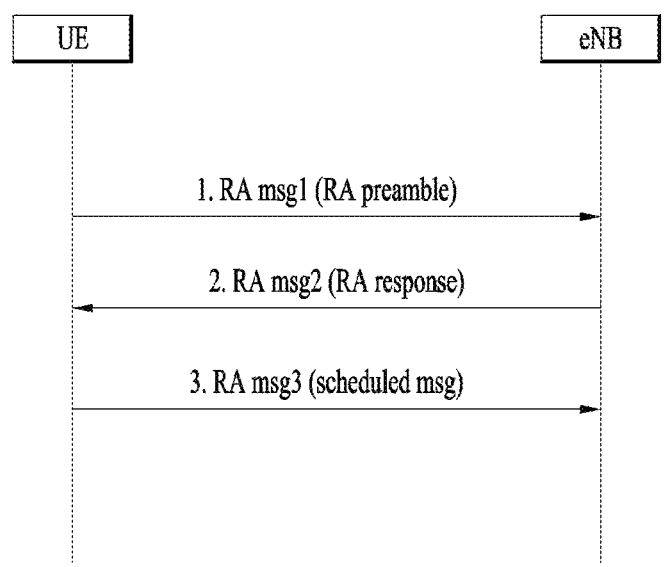
FIG. 6 is a flow diagram illustrating a random access procedure.

FIG. 6 is a flowchart illustrating a random access procedure in 3GPP LTE.

The random access procedure is used for a UE to obtain UL synchronization with a base station (BS) or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

>1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

>2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).

>3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
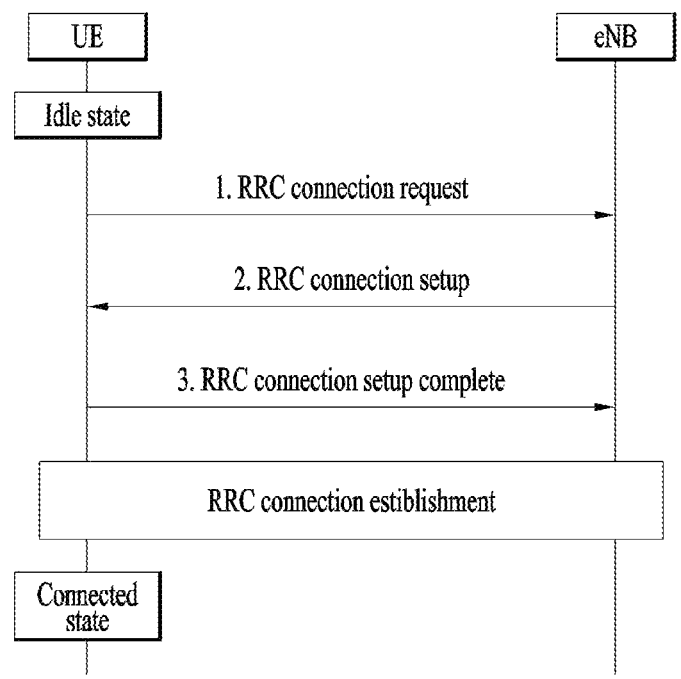
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

>1. When the UE in the idle state desires to establish RRC connection for reasons such as an attempt to make a call, a data transmission attempt, or a response of the eNB to paging, the UE transmits an RRC connection request message to the eNB first.

>2. Upon receiving the RRC connection request message from the UE, the eNB accepts the RRC connection request of the UE when the radio resources are sufficient, and then transmits an RRC connection setup message, which is a response message, to the UE.

>3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

In current 3GPP, a study on a next-generation mobile communication system after EPC is underway. For design of the next-generation mobile network system, for example, a 5G core network, 3GPP has defined service requirements through the study called services and markets technology enablers (SMARTER). System architecture 2 (SA2) is conducting Study on Architecture for Next Generation System, FS_NextGen, based on the SMARTER. 3GPP TS 23.501 defines the stage 2 system architecture for the 5G system including network slicing, 3GPP TS 23.502 defines processes for the 5G system, and 3GPP TS 23.503 defines a policy and charging control framework for the 5G system. The following terminologies are defined for the next-generation (NextGen) system (NGS) in 3GPP TR 23.799.

Evolved E-UTRA: A radio access technology (RAT) representing the evolution of an E-UTRA radio interface for operation in a NextGen system.

Network Capability: A network-provided and 3GPP-specified feature that typically is not used as a separate standalone "end user service", but rather as a component that may be combined into a telecommunication service that is offered to an "end user". For example, a location service is typically not used by an "end user" to simply query the location of another UE. As a feature or network capability, the location service may be used, for example, by a tracking application, which is then offered as the "end user service". The network capability may be used by a network internally and may be exposed to external users, that are also denoted third parties.

Network Function: A network function in TR 23.700 is a 3GPP adopted or 3GPP defined processing function in a network, which has a functional behavior or 3GPP defined interface. Note 3: A network function can be implemented as a network element on dedicated hardware, as a software instance running on dedicated hardware, or as a virtualized function instantiated on an appropriate platform (e.g., on cloud infrastructure).

NextGen Core Network: A core network specified in the present document, that connects to a NextGen access network.

NextGen RAN (NG RAN): A radio access network that supports one or more of the following operations:

Standalone new radio,

Standalone new radio is an anchor with evolved E-UTRA extensions,

Evolved E-UTRA,

Evolved E-UTRA is an anchor with evolved new radio extensions.

NG RAN has common characteristics in that a RAN interfaces with a NextGen core.
  NextGen Access Network (NG AN): A NextGen RAN or a non-3GPP access network which interfaces with a NextGen core.
  NextGen (NG) System: A NextGen system including an NG AN and a NextGen core.
  NextGen UE: A UE connecting to a NextGen system.
  PDU Connectivity Service: A service that provides exchange of PDUs between a UE and a data network.
  PDU Session: Association between a data network that provides a PDU connectivity service and a UE. The type of the association includes an IP type, an Ethernet type, and a non-IP type. In other words, while a legacy session has been of the IP type, a NextGen session may be distinguished even depending on whether session type is of the Ethernet type or the non-IP type.
  PDU Session of IP Type: Association between a UE and an IP data network.
  Service Continuity: Uninterrupted user experience of a service including the cases in which an IP address and/or an anchoring point changes.
  Session continuity:
The continuity of a PDU session. For a PDU session of an IP type, "session continuity" implies that an UP address is preserved for the lifetime of the PDU session.

A 5G system architecture is defined to support data connectivity and services enabling deployments to use techniques such as network function virtualization and software defined networking. The 5G system architecture is defined as service-based and the interaction between network functions is represented in two ways:
  > A service-based representation, where network functions (e.g., AMF) within the control plane enables other authorized network functions to access their services.
  > A reference point representation. This shows the interaction existing between NF services in the network functions described by point-to-point reference point (e.g., N11) between any two network functions (e.g., AMF and SMF).

The 5G system architecture consists of various network functions (NFs). The NFs constituting the 5G system architecture include, for example, an access and mobility management function (MF), a data network (DN), a policy control function (PCF), a session management function (SMF), unified data management (UDM), a user plane function (UPF), a user equipment (UE), and a (radio) access network ((R)AN). Among the NFs of the 5G system, the AMF includes, for example, the following functionality: termination of an RAN control plane (CP) interface (N2), termination of a NAS (N1), NAS ciphering and integrity protection, connection management, reachability management, mobility management, providing transport for SM messages between a UE and an SMF, EPS bearer ID allocation for interworking with an EPS, and the like. The 5G architecture includes various reference points. Thereamong, N1 is a reference point between a UE and an AMF and N2 is a reference point between an (R)AN and an AMF.

For definition of terminologies related to the 5G system architecture and a more detailed description thereof, refer to 3GPP TR 21.905 and 3GPP TS 23.501.

Network slicing is an important capability to bring network resource utilization efficiency, deployment flexibility, and support of fast growing over the top (OTT) applications and services. The 3GPP is considering network slicing as one of the key features of 5G.

A network slice is viewed as a logical end-to-end network that may be dynamically created. A given UE may access multiple slices over the same access network (e.g. over the same radio interface). Each slice may serve a particular service type with agreed upon service-level agreement (SLA). A network slice is defined within a PLMN and includes a core network control plane and user plane network functions as well as a 5G access network (AN). The 5G Access Network may be:
  A next generation (NG) radio access network described in 3GPP TS 38.300, or
  A non-3GPP access network where the UE may use any non-3GPP access to reach the 5G core network via a secured IPsec/IKE tunnel terminated on a non-3GPP interworking function (N3IWF).

TS 23.501 defines network function, slice, and slice instance as follows:
  Network Function: A 3GPP adopted or 3GPP defined processing function in a network, which has defined functional behaviour and 3GPP defined interfaces. (NOTE: A network function can be implemented either as a network element on a dedicated hardware, as a software instance running on a dedicated hardware, or as a virtualised function instantiated on an appropriate platform (e.g. on a cloud infrastructure))
  Network Slice: A logical network that provides specific network capabilities and network characteristics.
  Network Slice instance: A set of Network Function instances and the required resources (e.g. compute, storage and networking resources) which form a deployed Network Slice.
  A Network Slice may include:
  the Core Network Control Plane and User Plane Network Functions,
  5G Radio Access Network,
  the N3IWF functions to the non-3GPP Access Network.

Network slices may differ for supported features and network functions optimizations. The operator can deploy multiple Network Slice instances delivering exactly the same features but for different groups of UEs, e.g. as they deliver a different committed service and/or because they are dedicated to a customer.

A single UE may be served with one or more Network Slice instances simultaneously via a 5G-AN. The AMF instance serving the UE logically belongs to each of the Network Slice instances serving the UE, i.e. this AMF instance is common to the Network Slice instances serving a UE.

A PDU Session belongs to one and only one specific Network Slice instance per PLMN. Different Network Slice instances do not share a PDU Session, though different slices may have slice-specific PDU Sessions using the same data network name (DNN).

A Network Slice is identified with a single Network Slice selection assistance information (S-NSSAI). The S-NSSAI signaled by the UE to the network assists the network in selecting a particular Network Slice instance. An S-NSSAI is comprised of:
  A Slice/Service type (SST), which refers to the expected Network Slice behaviour in terms of features and services;
  A Slice Differentiator (SD), which is optional information that complements the Slice/Service type(s) to differentiate amongst multiple Network Slices of the same Slice/Service type.

The S-NSSAI can have standard values or PLMN-specific values. S-NSSAIs with PLMN-specific values are associated to the PLMN ID of PLMN that assigns it. An S-NSSAI shall not be used by the UE in access stratum procedures in any PLMN other than the one to which the S-NSSAI is associated.

The NSSAI is a collection of S-NSSAIs. Each S-NSSAI assists the network in selecting a particular Network Slice Instance. The CN part of a Network Slice instance(s) serving a UE is selected by CN.

The (R)AN may use Requested NSSAI in access stratum signalling to handle the UE Control Plane connection before the 5GC informs the (R)AN of the Allowed NSSAI. The Requested NSSAI is not used by the RAN for routing when the UE provides also a Temporary User ID.

When a UE is successfully registered, the CN informs the (R)AN by providing the whole Allowed NSSAI for the Control Plane aspects.

When a PDU session for a specific slice instance is established, the CN provides to the (R)AN the S-NSSAI corresponding to the slice instance that this PDU session belongs to enable the RAN to perform access specific functions.

Some standardized SST values have been defined. These SST values reflect the most commonly used slice/service types and assist with global interoperability for slicing.

TABLE 2

| Slice/Service type | SST value | Characteristics. |
| --- | --- | --- |
| eMBB | 1 | Slice suitable for the handling of 5G enhanced Mobile Broadband. |
| URLLC | 2 | Slice suitable for the handling of ultra-reliable low latency communications. |
| MIoT | 3 | Slice suitable for the handling of massive IoT. |

Subscription data include the S-NSSAI(s) of the Network Slices that the UE subscribes to. One or more S-NSSAIs can be marked as default S-NSSAI. If an S-NSSAI is marked as default, then the network is expected to serve the UE with the related Network Slice even when the UE does not send any S-NSSAI to the network in a Registration request.

A UE can be configured by the HPLMN with a Configured NSSAI per PLMN. A Configured NSSAI can be PLMN-specific and the HPLMN indicates to what PLMN(s) each Configured NSSAI applies, including whether the Configured NSSAI applies to all PLMNs, i. e. the Configured NSSAI conveys the same information regardless of the PLMN the UE is accessing (e.g. this could be possible for NSSAIs containing only standardized S-NSSAIs). When providing a Requested NSSAI to the network upon registration, the UE in a given PLMN shall only use S-NSSAIs belonging to the Configured NSSAI, if any, of that PLMN. Upon successful completion of a UE's Registration procedure, the UE may obtain from the AMF an Allowed NSSAI for this PLMN, which may include one or more S-NSSAIs. The Allowed NSSAI shall take precedence over the Configured NSSAI for this PLMN. The UE shall use only the S-NSSAIs in the Allowed NSSAI corresponding to a Network Slice for the subsequent Network Slice selection related procedures in the serving PLMN. This is known as Accepted NSSAI.

For each PLMN, the UE shall store the Configured NSSAI and, if any, the Allowed NSSAI. When the UE receives an Allowed NSSAI for a PLMN, it shall store it and override any previously stored Allowed NSSAI for this PLMN.

The establishment of User Plane connectivity to a Data Network via a network slice instance(s) comprises two steps:
performing a RM procedure to select an AMF that supports the required Network Slices
establishing one or more PDU session to the required Data network via the Network Slice Instance(s).

When a UE registers with a PLMN, if the UE for this PLMN has a Configured NSSAI or an Allowed NSSAI f, the UE shall provide to the network in RRC and NAS layer a Requested NSSAI containing the S-NSSAI(s) corresponding to the slice(s) to which the UE wishes to register, in addition to the Temporary User ID if one was assigned to the UE.

The Requested NSSAI may be either:
the Configured-NSSAI, or a subset thereof as described below, if the UE has no Allowed NSSAI for the current PLMN; or
the Allowed-NSSAI, or a subset thereof as described below, if the UE has an Allowed NSSAI for the current PLMN, or
the Allowed-NSSAI, or a subset thereof as described below, plus one or more S-NSSAIs from the Configured-NSSAI for which no corresponding S-NSSAI is present in the Allowed NSSAI and that were not previously permanently rejected (as defined below) by the network for the present tracking area.

The subset of Configured-NSSAI consists of a combination of S-NSSAIs including one or more S-NSSAI(s) in the Configured NSSAI applicable to this PLMN, if the S-NSSAI was not previously permanently rejected (as defined below) by the network for the present tracking area, or was not previously added by the UE in a Requested NSSAI.

The subset of Allowed NSSAI consists of a combination of S-NSSAIs including one or more S-NSSAI(s) in the last Allowed NSSAI for this PLMN.

The UE may provide in the Requested NSSAI an S-NSSAI from the Configured NSSAI that the UE previously provided to the serving PLMN in the current registration area.

The UE shall include the Requested NSSAI at RRC Connection Establishment and in NAS messages. The RAN shall route the NAS signaling between this UE and an AMF selected using the Requested NSSAI obtained during RRC Connection Establishment. If the RAN is unable to select an AMF based on the Requested NSSAI, it routes the NAS signaling to an AMF from a set of default AMFs.

Upon successful Registration, the UE is provided with a Temporary ID by the serving AME The UE shall include this Temporary ID in any RRC Connection Establishment during subsequent initial accesses to enable the RAN to route the NAS signaling between the UE and the appropriate AMF.

The serving PLMN may also return a new Allowed NSSAI identifying the Network Slices permitted by the serving PLMN for the UE. The UE shall store this new Allowed NSSAI and override any previously stored Allowed NSSAI for this PLMN.

The network may individually reject an S-NSSAI provided by the UE in the Requested NSSAI with a rejection cause. The network may also indicate if the rejection is permanent (e.g. the S-NSSAI is not supported by the PLMN in at least the current registration area) or temporary (e.g. the Network Slice corresponding to the S-NSSAI is temporarily unavailable).

When receiving from the UE a Requested NSSAI and a Temporary ID in RRC, if the RAN can reach an AMF corresponding to the Temporary ID, then RAN forwards the request to this AMF. Otherwise, the RAN selects a suitable AMF based on the Requested NSSAI provided by the UE and forwards the request to the selected AMF. If the RAN is not able to select an AMF based on the Requested NSSAI, then the request is sent to a default AMF.

To enable UEs to build a suitable communication environment by properly receiving paging or a system information block (SIB), every UE is currently supposed to camp on at least one cell. This operation is meant to allow a UE to make an emergency call or receive a disaster notification by selecting even a PLMN of another operator, when the UE has failed to detect its subscribed PLMN. For example, when accessing a network, the UE stores configuration information received from the network in a subscriber identity module (SIM) or a universal subscriber identity module (USIM) and then is powered off. When the UE is powered on again, the UE performs cell search according to the configuration information. According to the conventional technology, when the UE is disconnected from the network or is powered on, the UE performs cell search with RATs in an order indicated by the configuration information. That is, when the UE supports multiple RATs, information indicating an order in which the RATs are to be used for cell search is stored in the SIM/USIM. If the UE has subscribed to LTE services, the UE may be configured to first search for an LTE cell, that is, an E-UTRA cell. If the UE fails in detecting an E-UTRA cell to camp on, the UE may be configured to search for a 3G cell, that is, a UTRA cell. Camping on a cell by a UE will be described below in greater detail. When the UE is powered on or is to access a new cell, the UE acquires time synchronization and frequency synchronization with the cell and detects the physical layer cell ID of the cell in an initial cell search procedure. For the cell search procedure in the LTE system, the UE acquires downlink (DL) synchronization and information such as a cell ID by receiving a DL signal from an eNB. When the UE is switched on, the UE selects a PLMN by the NAS. PLMN selection is a UE-based procedure in which the UE selects candidate PLMNs one by one from a PLMN list and attempts registration to each PLMNN. For the selected PLMN, associated RAT(s) may have been set. When the UE does not support the associated RATs of PLMN+RAT pairs/combinations in the PLMN list, the UE ignores the PLMN+RAT pairs/combinations. The NAS provides a list of equivalent PLMNs, if available, that the access stratum (AS) uses for cell selection and cell reselection. With the cell selection, the UE searches for a suitable cell of the selected PLMN and chooses the cell to provide available services. Further, the UE tunes to a control channel of the cell. This choosing is known as "camping on the cell". If the UE loses the coverage of the cell or finds a more suitable cell according to cell reselection criteria, the UE reselects the cell and camps on the reselected cell. If the new cell does not belong to at least one tracking area to which the UE has been registered, location registration is performed. In idle mode, the UE may camp on a cell for the following five purposes:

a) It enables the UE to receive system information from the PLMN.

b) When the UE is registered and wishes to establish an RRC connection, the UE may do this by initially accessing the network on a control channel of the cell on which the UE is camped.

c) If the PLMN receives a call for the registered UE, the PLMN knows (in most cases) a set of tracking areas in which the UE is camped. The network may then transmit a "paging" message for the UE on the control channels of all the cells in this set of tracking areas. The UE may then receive the paging message because the UE is tuned to the control channel of a cell in one of the registered tracking areas and the UE may respond to the paging message received on the control channel.

d) It enables the UE to receive earthquake and tsunami warning system (ETWS) and commercial mobile alert system (CMAS) notifications.

e) It enables the UE to receive multimedia broadcast multicast service (MBMS).

When camped on a cell, the UE regularly searches for a better cell according to the cell reselection criteria. If a better cell is found, that cell is selected. The change of a cell may imply a change of RAT. For a normal service, the UE camps on a suitable cell and tunes to a control channel of that cell so that the UE may:

> receive system information from the PLMN; and
>> receive registration area information from the PLMN, for example, tracking area information; and
->> receive other AS and NAS information; and
> if registered:
>> receive paging and notification messages from the PLMN; and
>> initiate transfer to connected mode, when needed.

In the present disclosure, "barred cell" refers to a cell which a UE is not allowed to camp on, and "camped on a cell" means that a UE has completed the cell selection/reselection process and has chosen a cell. When the UE camps on a cell, the UE monitors system information and (in most cases) paging information. "Camped on any cell" means that a UE is in idle mode, has completed the cell selection/reselection process, and has chosen a cell irrespective of a PLMN ID. A cell on which a UE has camped on is referred to as a serving cell. The conventional PLMN selection is further described in 3GPP TS 22.011, 3GPP TS 23.122, and 3GPP TS 36.304.

When the UE is powered on or out of coverage, the UE should search for a suitable mobile communication operator which will provide a service to the UE (i.e., a PLMN which will service the UE). If the UE fails to detect a network of its subscribed operator in an area in which the UE is located, the UE selects one of available operators around the UE and starts to camp on and register to the selected operator. In this case, the UE is placed in a roaming situation.

According to the conventional technology, the UE may be configured with information about PLMN and RAT (e.g., WCDMA, LTE, and so on) pairs, and in the presence of the information, the UE starts to search PLMNs in order. For example, a PLMN list listing PLMN ID and RAT pairs (U+WCDMA, U+LTE, and so on where U+ is an operator, that is, a PLMN) is stored in the SIM or USIM, and the UE attempts to select the PLMNs in the order of storing the PLMNs in the SIM or USIM. Because a mobile communication operator may control the information stored in the SIM/USIM, the mobile communication operator may store PLMN lists in SIMs/USIMs and distribute the PLMN lists. When the UE is registered for service, the user of the UE subscribes to the mobile communication operator, or the system of the UE is upgraded, the UE may receive the PLMN list and store the received PLMN list in its SIM/USIM. The PLMN list is a list of preferred PLMNs in a priority order. If the UE finds a PLMN matching a PLMN+RAT pair in the PLMN list, the UE performs a registration procedure to the PLMN. However, since the UE conventionally selects a PLMN with no regard to a network slice, the following situations may occur.

A UE supporting network slicing receives network slice configuration information from a home operator. However, the UE may then perform PLMN selection and select a PLMN of an operator other than its home operator, and the selected PLMN may not support a network slice configured for the UE.

An operator introduces the network slice function only to a partial area. A UE which has accessed the operator may enter an area in which the operator does not support the network slice function and perform PLMN selection.

An operator introduces the network slice function to his entire business area. However, for a certain network slice type, the operator supports a corresponding network slice only in a specific area. Although a UE which has set the operator as its home operator accesses a network of the operator by PLMN selection, a network slice configured for the UE may not be supported in an area that the UE has accessed.

In the above situations, the UE may not get an intended service through a specific network slice. That is, although the UE succeeds in registering to a network, the UE is just registered without getting its intended service.

To avoid the problem, the following may be considered. Each BS transmits information about its supported network slices in a SIB (i.e., system information). A UE may then identify network slices that each PLMN supports by PLMN scanning Subsequently, the UE selects a PLMN that has notified the UE of support of an intended network slice and then attempts to register to the PLMN. However, this method still has the following problem.

For example, in the case where a UE is configured to use network slice A and network slice B, if a current accessed PLMN supports only network slice A, the UE may not get a service of network slice B.

Moreover, each operator may not support the network slice function by selection. In this case, when the UE does not attempt to register to a detected PLMN, and the PLMN is the only detected PLMN, the UE is placed in a state in which a service is not available to the UE.

In addition, because all possible combinations of PLMNs, RATs, and network slices should be considered, the PLMN selection time of the UE is increased.

The present disclosure proposes a method of enabling a UE to efficiently search for and select a PLMN in an environment in which networks slices are available. Specifically, the present disclosure proposes a method of increasing service satisfaction by reducing a time during which a UE is placed in a PLMN-unselected state, while enabling the UE to receive an intended service.

Figure 8:
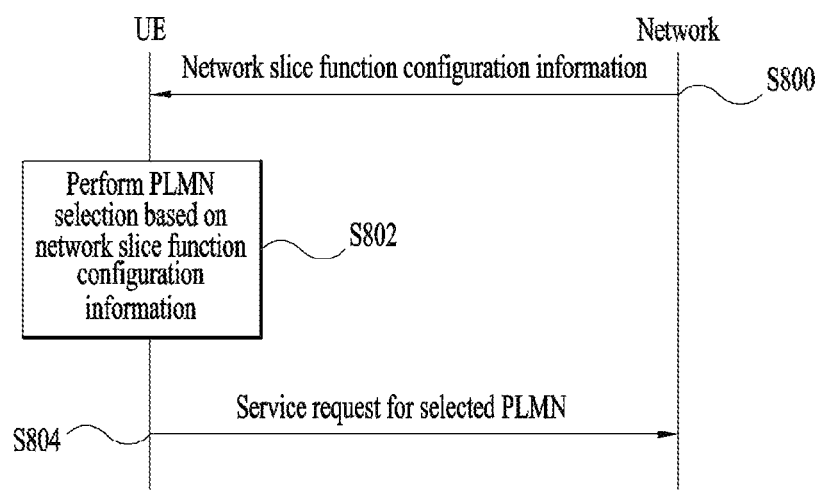
FIG. 8 is a diagram illustrating a mobile communication network (e.g., public land mobile network (PLMN)) selection procedure according to the present disclosure.

FIG. 8 is a diagram illustrating a PLMN selection procedure according to the present disclosure.

A network or operator transmits network slice function configuration information to a UE (S800). In the present disclosure, for each network slice configured for the UE, the network slice function configuration information includes priority information and/or information indicating whether mandatory access is required. Since the priority information and/or the information indicating whether mandatory access is required is subscribed service information, the priority information and/or the information indicating whether mandatory access is required may have been stored in a USIM or a SIM, or may be stored or updated in the USIM/SIM of the user when the user subscribes to a communication service or is connected to the network.

The priority information about the network slice indicates a network slice supported by a PLMN which is to be selected with priority in the PLMN selection procedure. Conventionally, PLMNs are selected in an arranged order from the PLMN list stored in the USIM/SIM of the UE. For example, in the absence of a PLMN satisfying a first PLMN ID+RAT pair in the PLMN list, the UE searches for a PLMN satisfying a second PLMN ID+RAT pair. In the present disclosure, the UE performs PLMN selection on PLMNs in the PLMN list based on the priority information about the network slices (S802). Even though a PLMN ranks high in the PLMN list, if the PLMN does not satisfy a network slice condition, the UE may not select the PLMN.

For example, it is assumed that two network slices, are assigned to a UE. It is also assumed that network slice #1 has priority 1 and network slice #2 has priority 2

Exemplary scenario 1: PLMN A supports only network slice #2, and PLMN B supports only network slice #1. In this case, the highest-priority one of the network slices configured for the UE is network slice #1. Because PLMN B provides a network slice satisfying the network slice condition as a result of the PLMN detection of the UE, that is, the highest-priority one of the network slices that the UE has subscribed to, the UE selects PLMN B.

Exemplary scenario 2: PLMN C supports only network slice #2, and PLMN D supports both of network slice #1 and network slice #2. In this case, the UE searches for a PLMN supporting all of the network slices configured for the UE. Because PLMN D provides the network slices satisfying the network slice condition as a result of the PLMN detection of the UE, the UE selects PLMN D.

The UE performs PLMN selection based on the network slice function configuration information, for example, the network priority information (S802). That is, when the UE has received network slice function configuration information for the UE and there are network slices configured for the UE, the UE searches for a PLMN supporting all of the network slices configured for the UE. In the presence of the PLMN, the UE selects the PLMN with priority. In the absence of any PLMN supporting all of the network slices configured for the UE, the UE searches for a PLMN supporting the highest-priority one of the network slices configured for the UE. In the presence of the PLMN, the UE selects the PLMN. In the absence of the PLMN supporting the highest-priority one of the network slices configured for the UE, the UE searches for a PLMN supporting a second highest-priority network slice. In the presence of the PLMN, the UE selects the PLMN. The UE continues this process. If the UE fails in detecting a PLMN supporting any of the network slices configured for the UE, the UE selects a PLMN according to the conventional technology or selects a PLMN randomly. If the UE has detected a plurality of PLMNs supporting network slices of the same priority, the UE selects a PLMN according to the order of PLMNs in the PLMN list. That is, in the presence of a plurality of PLMNs of the same priority in terms of network slices, the UE selects a PLMN ranked highest in the PLMN list.

Apart from the priority information about each network slice, the information indicating mandatory access is required for each network slice (hereinbelow, referred to as network slice mandatory access information) indicates whether the UE should select a PLMN supporting the network slice in the PLMN selection procedure. There may be a network slice to which each UE is mandatorily connected for its subscribed service, according to subscription information about the UE. For example, if a UE has subscribed to both of the Internet and voice over long term evolution (VoLTE), and intermittent disconnection from the Internet is tolerable but VoLTE is to be always accessible for the user of the UE, a PLMN which supports a network slice for Internet use for the UE but does not support a network slice for VoLTE for the UE may not satisfy a service requirement of the UE even though the UE accesses the PLMN. In this case, if the UE attempts to register to the PLMN that does not support the network slice for VoLTE, the UE may eventually recognize non-support of VoLTE in the PLMN and deregister from the PLMN in a registration request procedure to the network. Therefore, this is an unnecessary access/registration attempt. Accordingly, this case should be filtered out at the beginning. When the network slice mandatory access information is used for PLMN selection according to the present disclosure, the UE may not transmit, to the network, a connection request which will be rejected eventually by the network.

The UE performs PLMN selection based on the network slice function configuration information, for example, the network slice mandatory access information (S802).

For example, it is assumed that three network slices, network slice #3, network slice #4, and network slice #5 have been allocated to the UE. It is also assumed that mandatory access information of network slice #3 is Y (i.e., Yes), mandatory access information of network slice #4 is N (i.e., No), and mandatory access information of network slice #5 is Y.

Exemplary scenario 3: When PLMN E supports network slices #3 and #4, PLMN F supports network slices #4 and #5, and PLMN G supports network slices #3 and #5, the UE selects PLMN G.

That is, in the presence of network slices configured for the UE, the UE selects a PLMN that supports all of the configured network slices. In the absence of the PLMN that supports all of the configured network slices, the UE checks the mandatory access information of each configured network slice and selects a PLMN that supports all of network slices requiring mandatory access.

In the present disclosure, the network slice function configuration information may have, for example, the following structure.

> Network slice function configuration information:
>> Network slice common information
>> Network-specific information
>>> Network slice #1 information
>>>> Network slice ID
>>>> Network slice type
>>>> Network slice priority information
>>>> Network slice mandatory access information
>>> Network slice #2 information
>>>> Network slice ID
>>>> Network slice type
>>>> Network slice priority information
>>>> Network slice mandatory access information In the present disclosure, each PLMN may transmit information about its supported network slice to the UE by an SIB.

In the present disclosure, the UE may determine which network slice is supported by which PLMN by an NSSAI, an S-NSSAI, an SD, or an SST.

The RRC layer of the UE attempts to receive a SIB from each PLMN detected by the RRC layer, and transfers information about supported network slices indicated by the received SIB to the NAS layer. The UE performs a service request (e.g., a registration request, a PDU session request, or a network slice activation request) based on the information (S804). That is, the NAS layer of the UE performs a registration procedure or transmits a PDU session request or a network slice activation request to the network (S804).

When performing a service request, the NAS layer requests registration, PDU session activation or network slice activation, only for a network slice supported by the PLMN. That is, information about a network slice which is not supported by the PLMN may not be included in a registration request message, a network slice activation request message, or a PDU session request message.

Additionally, after registering to a PLMN, the UE may move to another tracking area in the PLMN. In spite of the same PLMN, a network slice supported by an area in which the UE has initially been registered may be different from a network slice supported in the area that the UE has moved to. When the UE determines that the current network slice is not supported any longer based on information about the network slice supported in the new area to which the UE has moved, the UE automatically deactivates the active network slice without receiving a deactivation command from the network.

Even though the UE is configured with a plurality of network slices, that is, a plurality of network slices are configured for the UE, the network slices are not always used. For example, even though an operator has allocated network slice 6 and network slice 7 to a UE, the UE may need to use all or a part of the network slices according to an ongoing active application. Accordingly, the present disclosure proposes that the UE selects a PLMN in consideration of only a network slice which has been activated or is being used by the UE in this situation. Therefore, the present disclosure may be limited such that network slice(s) considered by the UE in the afore-described PLMN selection procedure includes only network slice(s) which is being used or indicated as requiring activation by the NAS layer.

In another method, the operator may configure network slice(s) for each UE and, at the same time, transmit information about an area in which the network slice(s) is available.

Figure 9:
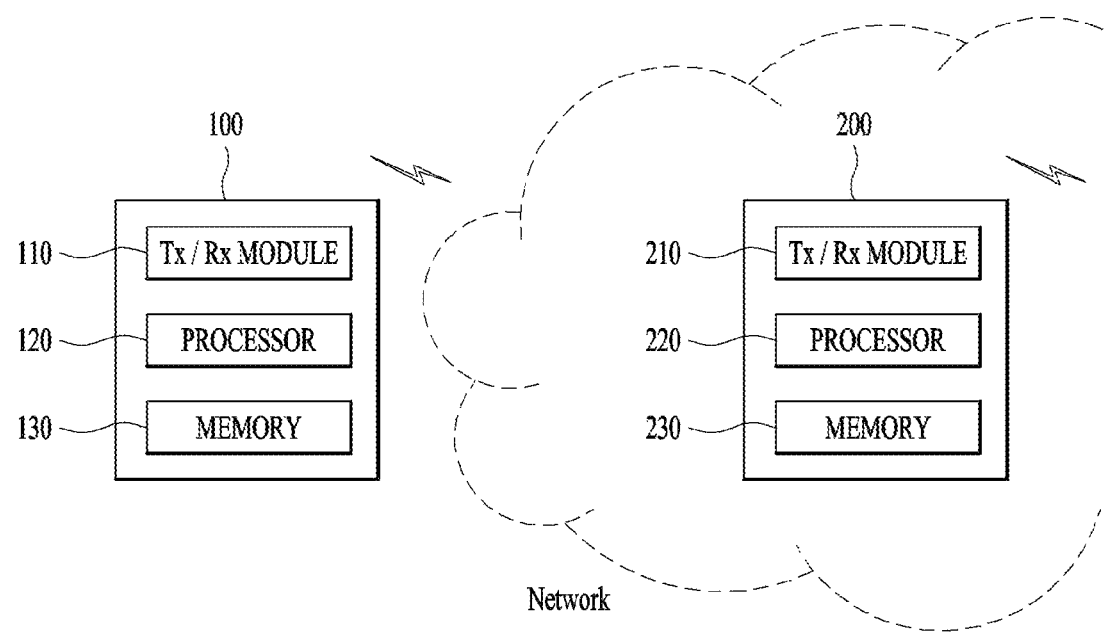
FIG. 9 illustrates a node device applied to the proposal of the present disclosure.

FIG. 9 is a block diagram illustrating the configuration of a node device applied to the proposal of the present disclosure.

The UE 100 according to the present disclosure may include a transmission/reception (Tx/Rx) module 110, a processor 120, and a memory 130. The Tx/Rx module 110 of the UE (100) may be referred to as a radio frequency (RF) unit, when communicating with the UE (100). The Tx/Rx module 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 9, the network node 200 according to the present disclosure may include a Tx/Rx module 210, a processor 220 and a memory 230. The Tx/Rx module 210 may be referred to as a transceiver. The Tx/Rx module 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown). In an access network, the network node 200 may be an eNB or a gNB. In a core network, the network node 200 may be a device including a mobility management entity (MME) or an access management function (AMF).

For configuration of the UE 100 and the network node 200, the details described in various examples of the present disclosure may be independently applied or implemented such that two or more examples are simultaneously applied. For simplicity, redundant description is omitted.

The processor 120 of the UE 100 may select a PLMN based on network slice priority information or network slice mandatory access information according to the present disclosure. The processor 120 may control the Tx/Rx module 110 of the UE 100 to transmit a service request (e.g., a registration request, a PDU session request, or a network slice activation request) for the selected PLMN. The Tx/Rx module 110 may receive the network slice priority information or the network slice mandatory access information from the network. The processor 120 may store the network slice priority information or the network slice mandatory access information received by the Tx/Rx module 110 in a SIM provided or mounted in the UE 100.

In the present disclosure, the processor 220 of the network node 200 may control the Tx/Rx module 210 to transmit network slice function configuration information of the present disclosure to a UE. For example, the processor 220 of the network node 200 may control the Tx/Rx module 210 to transmit network slice priority information or network slice mandatory access information to the UE. Upon receipt of a service request message from the UE at the Tx/Rx module 210, the processor 220 may control the Tx/Rx module 210 to forward the service request message to a node of the core network or transmit a response message to the service request message to the UE.

The examples of the present disclosure may be implemented through various means. For example, the examples may be implemented by hardware, firmware, software, or a combination thereof.

When implemented by hardware, a method according to examples of the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to examples of the present disclosure may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred examples of the present disclosure has been given to enable those skilled in the art to implement and practice the disclosure. Although the disclosure has been described with reference to exemplary embodiments, those skilled in the art will appreciate that various modifications and variations can be made in the present disclosure without departing from the spirit or scope of the disclosure described in the appended claims. Accordingly, the disclosure should not be limited to the specific examples described herein, but should be accorded the broadest scope consistent with the principles and novel features disclosed herein.

INDUSTRIAL APPLICABILITY

The communication method described above is applicable to various wireless communication systems including IEEE 802.16x and 802.11x systems as well as a 3GPP system. Furthermore, the proposed method is applicable to a millimeter wave (mmWave) communication system using an ultrahigh frequency band.

The invention claimed is:

1. A method of transmitting a registration request to a public land mobile network (PLMN) by a user equipment (UE) in a wireless communication system, the method comprising:
   receiving, via a base station, network slice function information including network slice mandatory access information, wherein the network slice mandatory access information includes information regarding network slices requiring mandatory access;
   selecting a target PLMN from amongst a plurality of PLMNs related to the base station; and
   transmitting, via the base station, a registration request to the selected target PLMN,
   wherein selecting the target PLMN comprises:
   based on an absence of a PLMN, among the plurality of PLMNs, supporting all network slices configured for the UE, selecting a PLMN, among the plurality of PLMNs, supporting all of the network slices requiring mandatory access as the target PLMN from among the network slices configured for the UE according to the network slice mandatory access information, wherein each of the plurality of PLMNs support a different one or more network slices.

2. The method according to claim 1, wherein selecting the target PLMN further comprises:
   based on a presence of a PLMN supporting all of the network slices configured for the UE, selecting the PLMN supporting all of the network slices configured for the UE as the target PLMN.

3. A user equipment (UE) configured for requesting registration to a public land mobile network (PLMN) in a wireless communication system, the UE comprising:
   a transceiver;
   a processor; and
   a computer memory operably connectable to the processor and storing instructions that, when executed, cause the processor to perform operations comprising:
   receiving, via a base station, via the transceiver, network slice function information including network slice mandatory access information, wherein the network slice mandatory access information includes information regarding network slices requiring mandatory access;
   selecting a target PLMN from amongst a plurality of PLMNs related to the base station; and
   transmitting, via the base station, a registration request to the selected target PLMN,
   wherein selecting the target PLMN comprises:
   based on an absence of a PLMN, among the plurality of PLMNs, supporting all network slices configured for the UE, selecting a PLMN, among the plurality of PLMNs, supporting all of the network slices requiring mandatory access as the target PLMN from among the network slices configured for the UE according to the network slice mandatory access information, wherein each of the plurality of PLMNs support a different one or more network slices.

4. The UE according to claim 3, wherein selecting the target PLMN further comprises:
based on a presence of a PLMN supporting all of the network slices configured for the UE, selecting the PLMN supporting all of the network slices configured for the UE as the target PLMN.

\* \* \* \* \*